(12) United States Patent
Lin et al.

(10) Patent No.: US 11,388,702 B2
(45) Date of Patent: Jul. 12, 2022

(54) RESOURCE DETERMINING METHOD, APPARATUS, NETWORK ELEMENT, AND SYSTEM

(71) Applicant: GUANGDONG OPPO MOBILE TELECOMMUNICATIONS CORP., LTD., Guangdong (CN)

(72) Inventors: Yanan Lin, Guangdong (CN); Jia Shen, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 21 days.

(21) Appl. No.: 16/872,888

(22) Filed: May 12, 2020

(65) Prior Publication Data
US 2020/0275436 A1    Aug. 27, 2020

Related U.S. Application Data

(63) Continuation of application No. PCT/CN2017/111613, filed on Nov. 17, 2017.

(51) Int. Cl.
H04W 72/04    (2009.01)
H04L 5/00     (2006.01)
(Continued)

(52) U.S. Cl.
CPC ....... *H04W 72/0413* (2013.01); *H04L 5/0053* (2013.01); *H04L 5/0094* (2013.01);
(Continued)

(58) Field of Classification Search
CPC ......... H04W 72/0413; H04W 72/0446; H04W 72/0453; H04L 5/0053; H04L 5/0094
See application file for complete search history.

(56) References Cited

U.S. PATENT DOCUMENTS 9,854,569 B2    12/2017 Yang et al.
2016/0044644 A1*  2/2016 Lyu .................. H04L 5/0092
                                                370/329
(Continued)

FOREIGN PATENT DOCUMENTS

CN    102438319 B    5/2012
CN    107113137 A    8/2017
(Continued)

OTHER PUBLICATIONS

English translation of International Search Report PCT/CN2017/111613 dated Jul. 26, 2018.
(Continued)

*Primary Examiner* — Diane L Lo
*Assistant Examiner* — Abusayeed M Haque
(74) *Attorney, Agent, or Firm* — Young Basile Hanlon & MacFarlane, P.C.

(57) ABSTRACT

Provided in the implementations of the present application are a resource determining method, apparatus, terminal, access network device, and system. The method includes: on the basis of first configuration information and second configuration information, a terminal determines a first time domain resource occupied by an aggregate PUCCH in each time slot for sending uplink control information; and, in n time slots, sending the uplink control information to an access network device by means of the first time domain resource, n being a positive integer; the first configuration information is used for indicating second time domain resource configured by the access network device for the aggregate PUCCH, the first time domain resource belonging to the second time domain resource; and the second configuration information is used for indicating a third time domain resource configured by the access network device and used for uplink signal transmission.

16 Claims, 8 Drawing Sheets

(51) Int. Cl.
*H04L 1/18* (2006.01)
*H04W 72/12* (2009.01)

(52) U.S. Cl.
CPC ... *H04W 72/0446* (2013.01); *H04W 72/0453* (2013.01); *H04W 72/1268* (2013.01)

(56) References Cited

U.S. PATENT DOCUMENTS

| | | | |
|---|---|---|---|
| 2017/0012748 A1* | 1/2017 | Dabeer | H04W 72/1215 |
| 2017/0164352 A1 | 6/2017 | Yang et al. | |
| 2017/0238304 A1* | 8/2017 | Ling | H04W 72/0413 370/336 |
| 2017/0273056 A1* | 9/2017 | Papasakellariou | H04W 72/042 |
| 2018/0124815 A1* | 5/2018 | Papasakellariou | H04L 5/0094 |
| 2018/0375619 A1* | 12/2018 | Hwang | H04L 5/0055 |
| 2019/0116489 A1* | 4/2019 | Harada | H04W 72/14 |
| 2019/0159191 A1* | 5/2019 | Kim | H04L 5/0094 |
| 2020/0029308 A1* | 1/2020 | Tiirola | H04W 72/0453 |
| 2020/0059332 A1* | 2/2020 | Takeda | H04L 5/0053 |
| 2020/0228289 A1* | 7/2020 | He | H04L 5/001 |
| 2020/0305094 A1* | 9/2020 | Ouchi | H04W 72/14 |
| 2020/0359391 A1* | 11/2020 | Baldemair | H04W 72/12 |

FOREIGN PATENT DOCUMENTS

| | | | |
|---|---|---|---|
| CN | 108370297 | A | 8/2018 |
| EP | 3214793 | A2 | 9/2017 |
| WO | 2017135887 | A1 | 8/2017 |

OTHER PUBLICATIONS

Intel Corporation. Long PUCCH over Multiple Slots. 3GPP TSG RAN WG 1 Meeting; 90bis RI-1717387. Oct. 13, 2017, section 2.2.
ZTE eta. Support of Long-PUCCH over Multiple Slots. 3GPP TSG RAN WG 1 Meeting; #90bis RI-1717517. Oct. 13, 2017 , section 2.
LG Electronics. Support of Long PUCCH over Multiple Slots for NR. 3GPP TSG RAN; WG1 Meeting 90bis RI-1717961. Oct. 13, 2017, section 2.
Indian Examination Report for IN Application 202017020219 dated Jun. 21, 2021. (7 pages).
Chinese Notice of Allowance with English Translation for CN Application 202010650701.5 dated Jun. 16, 2021. (8 pages).
Samsung, Multi-Slot Long PUCCH Transmission, 3GPP TSG RAN WG1 Meeting #90b, R1-1717653, Oct. 9-13, 2017. (5 pages).
Extended European Search Report for EP Application 17932089.0 dated Sep. 15, 2020.
Extended European Search Report for EP Application 21178583.7 dated Aug. 23, 2021. (7 pages).
Japanese Notice of Reasons for Refusal with English Translation for JP Application 2020526621 dated Nov. 19, 2021. (9 pages).
3GPP TSG RAN WG1 Meeting #88bis Spokane, USA, R1-1704211, NR-PUCCH Resource Determination, Huawei , Hi Silicon, Apr. 3-7, 2017, 4 pages.
Japanese Decision of Refusal with English Translation for JP Application 2020526621 dated Apr. 12, 2022. (6 pages).

* cited by examiner

RESOURCE DETERMINING METHOD, APPARATUS, NETWORK ELEMENT, AND SYSTEM

CROSS-REFERENCE TO RELATED APPLICATION(S)

This application is a continuation application of International Application No. PCT/CN2017/111613, filed on Nov. 17, 2017, and the entire disclosure of the application is hereby incorporated by reference.

TECHNICAL FIELD

Implementations of the present application relate to the field of communication, in particular to a method for determining a resource, an apparatus, a network element and a system.

BACKGROUND

In the 5th generation (5G) technology, in order to ensure coverage of an uplink control channel, a repetition Physical Uplink control channel (long Physical Uplink Control Channel (PUCCH) over multiple slots) is introduced. Herein, the repetition PUCCH supports transmitting same uplink control information in different time slots, and the repetition PUCCH occupies the same or different quantities of time domain symbols in different time slots.

In a 5G network, before a terminal transmits uplink control information to an access network device through a repetition PUCCH, the access network device first needs to send control signaling to the terminal, wherein the control signaling is used for indicating a location or a quantity of symbols of a time domain resource of the repetition PUCCH used by the terminal when sending the uplink control information. After receiving the control signaling, the terminal transmits uplink control information according to the time domain resource of the repetition PUCCH indicated by the control signaling.

When the repetition PUCCH occupies different time domain symbols in different time slots, the control signaling needs to indicate the time domain symbol occupied or a length of symbols occupied by a PUCCH within each time slot, and in such a situation, overhead of the control signaling is very large.

SUMMARY

Implementations of the present application provide a method for determining a resource, an apparatus, a network element and a system.

According to a first aspect of the present application, a method for determining a resource is provided, including: determining, by a terminal according to first configuration information and second configuration information, a first time domain resource of a repetition Physical Uplink Control Channel (PUCCH) for sending uplink control information; and sending, by the terminal, the uplink control information to an access network device through the first time domain resource in n time slots, wherein the n is a positive integer; wherein the first configuration information is used for indicating a second time domain resource configured by the access network device for the repetition PUCCH, and the first time domain resource belongs to the second time domain resource; and the second configuration information is used for indicating a third time domain resource for uplink signal transmission configured by the access network device.

Optionally, the first time domain resource is an intersection of the second time domain resource and an available time domain resource, wherein the available time domain resource is determined according to the third time domain resource.

Optionally, the second configuration information is information semi-statically configured, and/or the second configuration information is information semi-persistently configured, and/or the second configuration information is information dynamically configured.

Optionally, the second configuration information includes: configuration information for indicating a time domain resource occupied by an SRS for uplink channel quality measurement; and/or, configuration information for indicating a subframe format.

Optionally, a mode in which the first configuration information indicates the second time domain resource is one of following modes: indicating a quantity of time slots and a quantity of symbols of the repetition PUCCH in each time slot; indicating a quantity of time slots and a starting time point and a quantity of symbols of the repetition PUCCH in each time slot; indicating a quantity of time slots and an ending time point and a quantity of symbols of the repetition PUCCH in each time slot; indicating a quantity of time slots and identifiers of symbols of the repetition PUCCH in each time slot; indicating identifiers of time slots and a quantity of symbols of the repetition PUCCH in each time slot; indicating identifiers of time slots and a starting time point and a quantity of symbols of the repetition PUCCH in each time slot; indicating identifiers of time slots and an ending time point and a quantity of symbols of the repetition PUCCH in each time slot; and indicating identifiers of time slots and identifiers of symbols of the repetition PUCCH in each time slot; wherein the each time slot includes at least one symbol.

Optionally, the n is greater than 1, and after sending, by the terminal, the uplink control information to the access network device through the first time domain resource in first m time slots of the n time slots, the method further includes: receiving, by the terminal, downlink indication information sent by the access network device; stopping, by the terminal according to the downlink indication information, using a subsequent aggregated PUCCH to send the uplink control information; or, using, by the terminal according to the downlink indication information, a subsequent aggregated PUCCH to send other uplink control information; wherein the subsequent aggregated PUCCH refers to a repetition PUCCH in the n time slots except the first m time slots; the m is an integer, and $1 \le m < n$.

Optionally, the uplink control information includes feedback information, wherein the feedback information is an acknowledgement response or a non-acknowledgement response, the acknowledgement response is used for indicating that downlink data have been correctly received, and the non-acknowledgement response is used for indicating that the downlink data have not been correctly received; the downlink data are data sent by the access network device received by the terminal before sending the uplink control information; the downlink indication information is a downlink Grant, and the downlink indication information is used for indicating to schedule a HARQ process corresponding to the feedback information to send uplink data.

Optionally, before determining, by the terminal according to the first configuration information and the second configuration information, the first time domain resource occupied by the repetition PUCCH for sending the uplink control information on the each time slot, the method further includes: receiving the first configuration information sent by the access network device; and receiving the second configuration information sent by the access network device.

According to a second aspect of the present application, a method for determining a resource is provided, including: determining, by an access network device according to first configuration information and second configuration information, a first time domain resource of a repetition PUCCH for transmitting uplink control information; and receiving, by the access network device, the uplink control information sent by a terminal through the first time domain resource in n time slots, wherein the n is a positive integer; wherein the first configuration information is used for indicating a second time domain resource configured by the access network device for the repetition PUCCH, and the first time domain resource belongs to the second time domain resource; the second configuration information is used for indicating a third time domain resource for uplink signal transmission configured by the access network device.

Optionally, the first time domain resource is an intersection of the second time domain resource and an available time domain resource, wherein the available time domain resource is determined according to the third time domain resource.

Optionally, the second configuration information is information semi-statically configured, and/or the second configuration information is information semi-persistently configured, and/or the second configuration information is information dynamically configured.

Optionally, the second configuration information includes: configuration information for indicating a time domain resource occupied by an SRS for uplink channel quality measurement; and/or, configuration information for indicating a subframe format.

Optionally, a mode in which the first configuration information indicates the second time domain resource is one of following modes: indicating a quantity of time slots and a quantity of symbols of the repetition PUCCH in each time slot; indicating a quantity of time slots and a starting time point and a quantity of symbols of the repetition PUCCH in each time slot; indicating a quantity of time slots and an ending time point and a quantity of symbols of the repetition PUCCH in each time slot; indicating a quantity of time slots and identifiers of symbols of the repetition PUCCH in each time slot; indicating identifiers of time slots and a quantity of symbols of the repetition PUCCH in each time slot; indicating identifiers of time slots and a starting time point and a quantity of symbols of the repetition PUCCH in each time slot; indicating identifiers of time slots and an ending time point and a quantity of symbols of the repetition PUCCH in each time slot; and indicating identifiers of time slots and identifiers of symbols of the repetition PUCCH in each time slot; wherein the each time slot includes at least one symbol.

Optionally, the n is greater than 1, and after receiving, by the access network device, the uplink control information on the first m time slots of the n time slots, the method further includes: sending downlink indication information to the terminal, wherein the downlink indication information includes information indicating the terminal to stop using a subsequent aggregated PUCCH to send the uplink control information; or, the downlink indication information includes information indicating the terminal to use a subsequent aggregated PUCCH to send other uplink control information, wherein the m is an integer and $1 \leq m < n$; wherein the subsequent aggregated PUCCH refers to a repetition PUCCH in the n time slots except the first m time slots.

Optionally, the uplink control information includes feedback information, wherein the feedback information is an acknowledgement response or a non-acknowledgement response, the acknowledgement response is used for indicating that downlink data have been correctly received, and the non-acknowledgement response is used for indicating that the downlink data have not been correctly received; the downlink data are data which the access network device sends to the terminal before receiving the uplink control information; the downlink indication information is a downlink grant (DL Grant), and the downlink indication information is used for indicating to schedule a HARQ process corresponding to the feedback information to send uplink data.

Optionally, before receiving, by the access network device, uplink data sent by the terminal through a repetition PUCCH in at least one time slot, the method further includes: sending the first configuration information to the terminal; and sending the second configuration information to the terminal.

According to a third aspect of the present application, an apparatus for determining a resource is provided, including at least one unit for implementing the method for determining the resource as described in the above first aspect.

According to a fourth aspect of the present application, an apparatus for determining a resource is provided, including at least one unit for implementing the method for determining the resource as described in the above second aspect.

According to a fifth aspect of implementations of the present application, a terminal is provided, including a processor and a memory, wherein the memory stores at least one instruction, and the processor is used for executing the instruction to implement the method for determining the resource as described in the above first aspect.

According to a sixth aspect of implementations of the present application, an access network device is provided, including a processor and a memory, wherein the memory stores at least one instruction, and the processor is used for executing the instruction to implement the method for determining the resource as described in the above second aspect.

According to a seventh aspect of implementations of the present application, a computer readable storage medium is provided, including at least one instruction, which a processor is used for executing to implement the method for determining the resource as described in the above first aspect; or to implement the method for determining the resource as described in the above second aspect.

According to an eighth aspect of implementations of the present application, a communication system is provided, including a terminal and a server; the terminal may be the terminal provided in the fifth aspect; and the access network device may be the access network device provided in the sixth aspect.

BRIEF DESCRIPTION OF DRAWINGS

To describe technical solutions of implementations of the present application more clearly, accompanying drawings that need to be used in description of the implementations will be briefly introduced below. It is apparent that the accompanying drawings described below are only some implementations of the present application; and for a person of ordinary skill in the art, other drawings may be obtained according to these drawings without paying an inventive effort.

DETAILED DESCRIPTION

In order to make purposes, technical solutions and advantages of the present application clearer, implementations of the present application will be described in further detail below with reference to the accompanying drawings.

The "module" mentioned herein generally refers to a program or instructions stored in a memory capable of implementing certain functions; the "unit" mentioned herein generally refers to a logically divided functional structure, and the "unit" may be implemented by pure hardware or a combination of hardware and software.

The "multiple" mentioned herein refers to two or more. "And/or" describes an association relationship of associated objects, indicating that there may be three relationships, for example, A and/or B may represent three situations: A alone, A and B at the same time, and B alone. Symbol "/" generally indicates that objects before and after the symbol "/" is in an "or" relationship. The words "first", "second" and the like used in the specification and claims of the present application do not indicate any order, quantity or importance, but are only used to distinguish different components.

Figure 1:
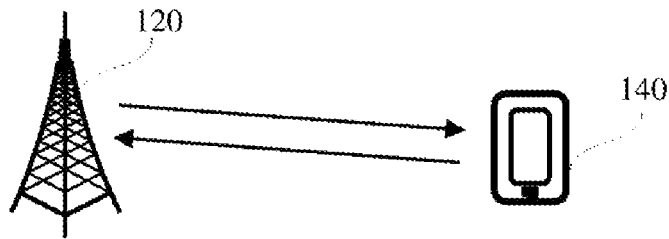
FIG. 1 is a schematic structural diagram of a communication system provided by an example implementation of the present application.

Please refer to FIG. 1, which shows a schematic structural diagram of a communication system 100 according to an implementation of the present application. The communication system may be a 5G system (also called a New Radio (NR) system); or, a Long Term Evolution (LTE) system; or, it may be a Licensed Assisted Access (LAA)-Long Term Evolution (LTE) system; or, it may be a Standalone LTE Over Unlicensed Spectrum (Standalone ULTE) system on an unlicensed frequency band, which is not limited in this implementation. The communication system 100 includes an access network device 120 and a terminal 140.

The access network device 120 may be a base station, wherein the base station may be used for performing inter-conversion between a received radio frame and an IP packet message, and may also coordinate attribute management for an air interface. For example, the base station may be an evolutional Node B (eNB or e-NodeB) in LTE, or a base station adopting a centralized distributed architecture in a 5G system. When the access network device 120 adopts a centralized distributed architecture, it usually includes a central unit (CU) and at least two distributed units (DUs). The central unit is provided with a protocol stack of a Packet Data Convergence Protocol (PDCP) layer, a Radio Link Control (RLC) layer and a Media Access Control (MAC) layer; and the distributed unit is provided with a Physical (PHY) protocol stack. Implementations of the present disclosure do not limit the specific implementation of the access network device 120. Optionally, the access network device may also include a Home eNB (HeNB), a Relay, a Pico base station (Pico), etc.

The access network device 120 and the terminal 140 establish a wireless connection through a wireless air interface. Optionally, the wireless air interface is a wireless air interface based on 5G standard, for example, the wireless air interface is a New Radio (NR); or, the wireless air interface may be a wireless air interface based on a further next generation mobile communication network technical standard of 5G; or, the wireless air interface may be a wireless air interface based on 4G standard (a LTE system). The access network device 120 may receive uplink control information sent by the terminal 140 through a wireless connection.

The terminal 140 may refer to a device which performs data communication with the access network device 120. The terminal 140 may communicate with one or more core networks via a Radio Access Network (RAN). The terminal 140 may be a mobile terminal, such as a mobile phone (or called a "cellular" phone) and a computer having a mobile terminal, for example, a portable, pocket-sized, handheld, computer-built or vehicle-mounted mobile device. For example, a Subscriber Unit, a Subscriber Station, a Mobile Station, a Mobile, a Remote Station, an Access Point, a Remote Terminal, an Access Terminal, a User Terminal, a User Agent, a User Device, or a User Equipment (UE). Optionally, the terminal 140 may be a Relay device, which is not limited in this implementation. The terminal 140 may send an uplink signal to the access network device 120 through a wireless connection between the terminal 140 and the access network device 120.

Optionally, the terminal 140 sends uplink control information to the access network device 120 through a Physical Uplink Control CHannel (PUCCH).

Optionally, the PUCCH may be a repetition PUCCH. When a terminal sends uplink control information through the repetition PUCCH, it needs to first determine which resources are resources of the repetition PUCCH, and use the determined resources to send uplink control information.

It should be noted that the mobile communication system shown in FIG. 1 may include multiple access network devices 120 and/or multiple terminals 140, which is illustrated in FIG. 1 by showing one access network device 120 and one terminal 140 as an example, but this implementation is not limited thereto.

In the present application, the repetition PUCCH is a PUCCH, which is configured by an access network device, for transmitting same uplink control information over different time slots.

Optionally, the terminal may send same uplink control information through the repetition PUCCH; or, may send different uplink control information through the repetition PUCCH. Herein, the same uplink control information may be the same in that information contents are same, or in that information contents and transmission modes are same, and this implementation is not limited to this.

Herein, each time slot includes at least one symbol (in the time domain), and illustratively, each time slot includes 14 symbols.

Optionally, the time domain resource occupied by the repetition PUCCH configured by the access network device may be configured by predefinition, and/or preconfigured by high-layer signaling, and/or configured by physical layer signaling, etc. Illustratively, at least one situation that the repetition PUCCH occupies the time domain resource is defined through high-level signaling, the access network device selects one of the at least one situation to configure the time domain resource of the repetition PUCCH, and notifies the terminal of the time domain resource configured for the repetition PUCCH through physical layer signaling. For example, the access network device informs the terminal of the time domain resource configured for the repetition PUCCH by sending configuration information to the terminal.

For example, situations, defined in high-level signaling, that the repetition PUCCH occupies the time domain resource are following 3 situations: the first is the 4th symbol to the 14th symbol in each time slot; the second is the 4th symbol to the 13th symbol in each time slot; the third is the 7th symbol to the 14th symbol in each time slot. If the access network device configures, according to the second situation, the time domain resource of the repetition PUCCH, then the terminal transmits uplink control information which needs to be transmitted through the repetition PUCCH through the 4th symbol to the 13th symbol in the each time slot.

Of course, the above mode of configuring the time domain resource of the repetition PUCCH and the indication mode of the time domain resource of the repetition PUCCH are only illustrative. In an actual implementation, the access network device may determine the mode of configuring the time domain resource of the repetition PUCCH by itself, and this implementation is not limited to this.

Optionally, quantities of symbols occupied by the repetition PUCCH in various time slots are same; or, quantities of symbols occupied by the repetition PUCCH in various time slots are different.

Optionally, identifiers of symbols occupied by the repetition PUCCH in various time slots are same; or, identifiers of symbols occupied by the repetition PUCCH in various time slots are different.

Optionally, the repetition PUCCH may also be referred to as a long PUCCH over multiple slots; or, a long PUCCH, etc., and the name of the repetition PUCCH is not limited in this implementation.

Optionally, the present application does not limit a frequency domain position of the repetition PUCCH, and illustratively, frequency domain positions of the repetition PUCCH in different time slots are same; or, frequency domain positions of the repetition PUCCH in different time slots are different.

Optionally, in the present application, the time domain resource may be a Physical Resource Block (PRB), a Physical Resource Block pair (PRB pair), a Physical Resource Block Group (RBG), or a resource of a Virtual Resource Block (VRB) in the time domain. Optionally, one PRB pair includes 12 consecutive subcarriers in the frequency domain and 14 consecutive symbols in the time domain. Herein, the symbol is an Orthogonal Frequency Division Multiplexing (OFDM) symbol or a Single-carrier Frequency-Division Multiple Access (SC-FDMA) symbol of a mobile communication system in which the frequency domain of a subcarrier is 15 kHz, or the symbol is a symbol of a communication system in which the frequency domain of a subcarrier is greater than 15 kHz. A PRB occupies a resource of a transmission time length in the time domain. In different mobile communication versions, the transmission time length may be any quantity of symbols from 1 symbol to 14 symbols.

Figure 2:
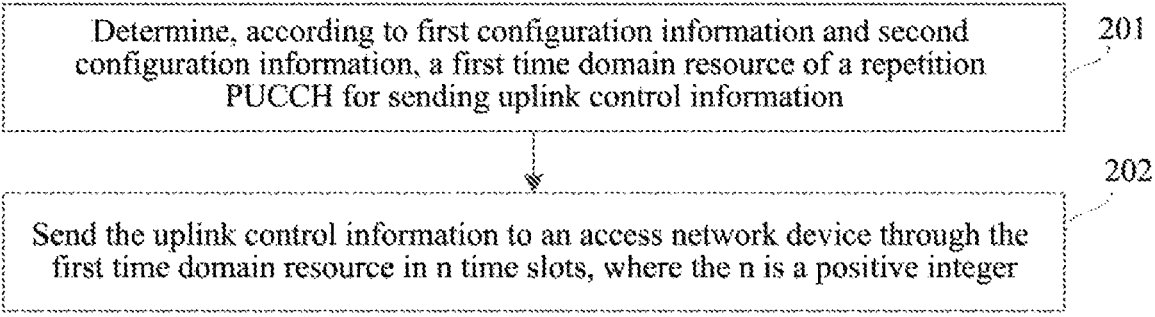
FIG. 2 is a flowchart of a method for determining a resource provided by an example implementation of the present application.

Please refer to FIG. 2, which shows a flowchart of a method for determining a resource provided by an example implementation of the present application. In this implementation, description is given by taking a terminal as the executor of various acts as an example, wherein the terminal may be the terminal 140 in the communication system 100 shown in FIG. 1. This method includes following acts 201 and 202.

In act 201, a terminal determines, according to first configuration information and second configuration information, a first time domain resource of a repetition PUCCH for sending uplink control information.

The first configuration information is sent by an access network device to the terminal. The first configuration information is used for indicating a second time domain resource configured by the access network device for the repetition PUCCH, and the first time domain resource belongs to the second time domain resource.

Illustratively, if the terminal needs to use the whole second time domain resource to send uplink control information, then the first time domain resource is the same as the second time domain resource. If the terminal only needs to use part of the second time domain resource to send uplink control information, then the first time domain resource is a part of the second time domain resource.

The second configuration information is sent by the access network device to the terminal. The second configuration information is used for indicating a third time domain resource configured by the access network device for uplink signal transmission.

Optionally, the second configuration information may also indicate a time domain resource configured by the access network device for downlink signal transmission. For example, when the second configuration information is used for indicating a subframe format, the second configuration information may indicate both the third time domain resource configured by the access network device for the uplink signal transmission and the time domain resource configured by the access network device for the downlink signal transmission.

The terminal may determine, according to the second configuration information, an available time domain resource for uplink transmission, wherein the available time domain resource refers to a time domain resource on which the terminal can transmit uplink control information.

Optionally, the second configuration information may be information semi-statically configured, and/or the second configuration information may be information semi-persistently configured, and/or the second configuration information may be information dynamically configured.

Optionally, in the present application, information semi-statically configured and information semi-persistently configured are used for indicating that time domain resources for transmitting uplink signals are configured in every fixed period; and the information dynamically configured is used for dynamically indicating time domain resources for transmitting uplink signals.

Optionally, the access network device sends the first configuration information and the second configuration information simultaneously; or, the access network device first sends the first configuration information and then sends the second configuration information; or, the access network device first sends the second configuration information and then sends the first configuration information. This implementation does not limit sending timing of the first configuration information and the second configuration information.

In act 202, the terminal sends uplink control information to the access network device through the first time domain resource in n time slots, wherein the n is a positive integer.

If a signal transmission power of the terminal is small, then the terminal needs to send same uplink control information multiple times in order to ensure that the access network device can successfully parse out the uplink control information based on received information, and in such a situation, the terminal uses the first time domain resource in the n time slots to send the uplink control information.

To sum up, in the method for determining the resource provided in this implementation, the terminal determines, through the first configuration information and the second configuration information, the time domain resource of the repetition PUCCH for sending the uplink control information, and since the second time domain resource of the repetition PUCCH configured by the access network device can be determined according to the first configuration information, and the available time domain resource for the uplink transmission can be determined according to the second configuration information, the terminal can directly use the available time domain resource in the second time domain resource to transmit the uplink control information, with no need of additionally sending, by the access network device, control signaling to indicate the time domain resource for transmitting the uplink control information, which can solve a problem of large overhead of control signaling and save overhead of control information.

In addition, in a scenario where the access network device dynamically configures the third time domain resource, if the access network device additionally sends control signaling to indicate the time domain resource used for transmitting uplink control information in the second time domain resource, following situations may occur: the access network device sends second configuration information dynamically configured to the terminal, and generates, according to the second configuration information, control signaling, wherein the control signaling indicates the terminal to use a 4th symbol in time slot 1 and a 4th symbol in time slot 2 to send uplink control information; the terminal receives the control signaling and uses the 4th symbol in time slot 1 and the 4th symbol in time slot 2 to send the uplink control information.

If the terminal receives the second configuration information, which is dynamically configured and sent by the access network device for the second time, before sending the uplink control information at the 4th symbol in time slot 2, and the second configuration information indicates that the 4th symbol in time slot 2 is used for downlink signal transmission, then it is possible that the terminal still transmits, according to the control signaling, the uplink control information at the 4th symbol in time slot 2, resulting in a problem of resource configuration error.

In the present application, the terminal determines, according to the first configuration information and the second configuration information, the time domain resource to be used when sending the uplink control resource, and since influence of the second configuration information is considered, the problem of resource configuration error will not occur, ensuring that normal transmission of uplink control information in the scenario of dynamically configuring the third time domain resource.

In addition, since the time domain resource of the repetition PUCCH which the first configuration information is used for indicating is applicable to different time slots, while the control signaling needs to indicate the time domain resource of the repetition PUCCH in each time slot, a signaling length of the control signaling is longer than that of the first configuration information. For example, the first configuration information is used for indicating the 4th symbol to the 14th symbol in each time slot, while the control signaling indicates the 1st, the 3rd and the 5th symbols in the first time slot, the 3rd symbol in the second time slot, and the 4th symbol in the third time slot and so on, and then the signaling length of the first configuration information is smaller than that of the control signaling.

Figure 3:
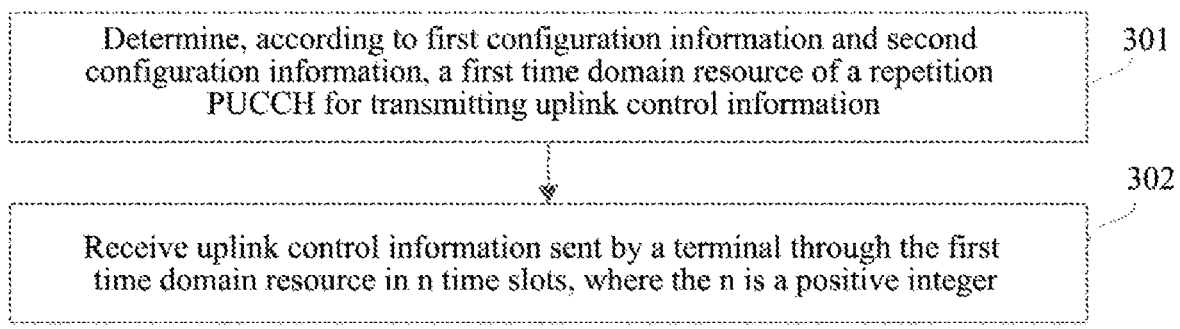
FIG. 3 is a flowchart of a method for determining a resource provided by another example implementation of the present application.

Please refer to FIG. 3, which shows a flowchart of a method for determining a resource provided by an example implementation of the present application. In this implementation, description is given by taking an access network device as an executor of various acts as an example, wherein the access network device may be the access network device 120 in the communication system 100 shown in FIG. 1. This method includes following acts 301 and 302.

In act 301, the access network device determines, according to first configuration information and second configuration information, a first time domain resource of a repetition PUCCH for transmitting uplink control information.

The first configuration information is used for indicating a second time domain resource configured by the access network device for the repetition PUCCH, and the first time domain resource belongs to the second time domain resource.

Please refer to act 201 for relevant description of the first configuration information for details, which is not repeated here in this implementation.

The second configuration information is used for indicating a third time domain resource configured by the access network device for uplink signal transmission.

Please refer to act 201 for relevant description of the second configuration information for details, which is not repeated here in this implementation.

In act 302, the access network device receives uplink control information sent by the terminal through the first time domain resource in n time slots, wherein the n is a positive integer.

To sum up, in the method for determining the resource provided in this implementation, the access network device determines, through the first configuration information and the second configuration information, the time domain resource of the repetition PUCCH of the uplink control information, and since the second time domain resource of the repetition PUCCH configured by the access network device can be determined according to the first configuration information, and the available time domain resource for the uplink transmission can be determined according to the second configuration information, the terminal can directly use the available time domain resource in the second time domain resource to transmit the uplink control information, with no need of generating additional control signaling by the access network device to indicate the time domain resource for transmitting the uplink control information, which can solve a problem of large overhead of control signaling and save overhead of control information.

Figure 4:
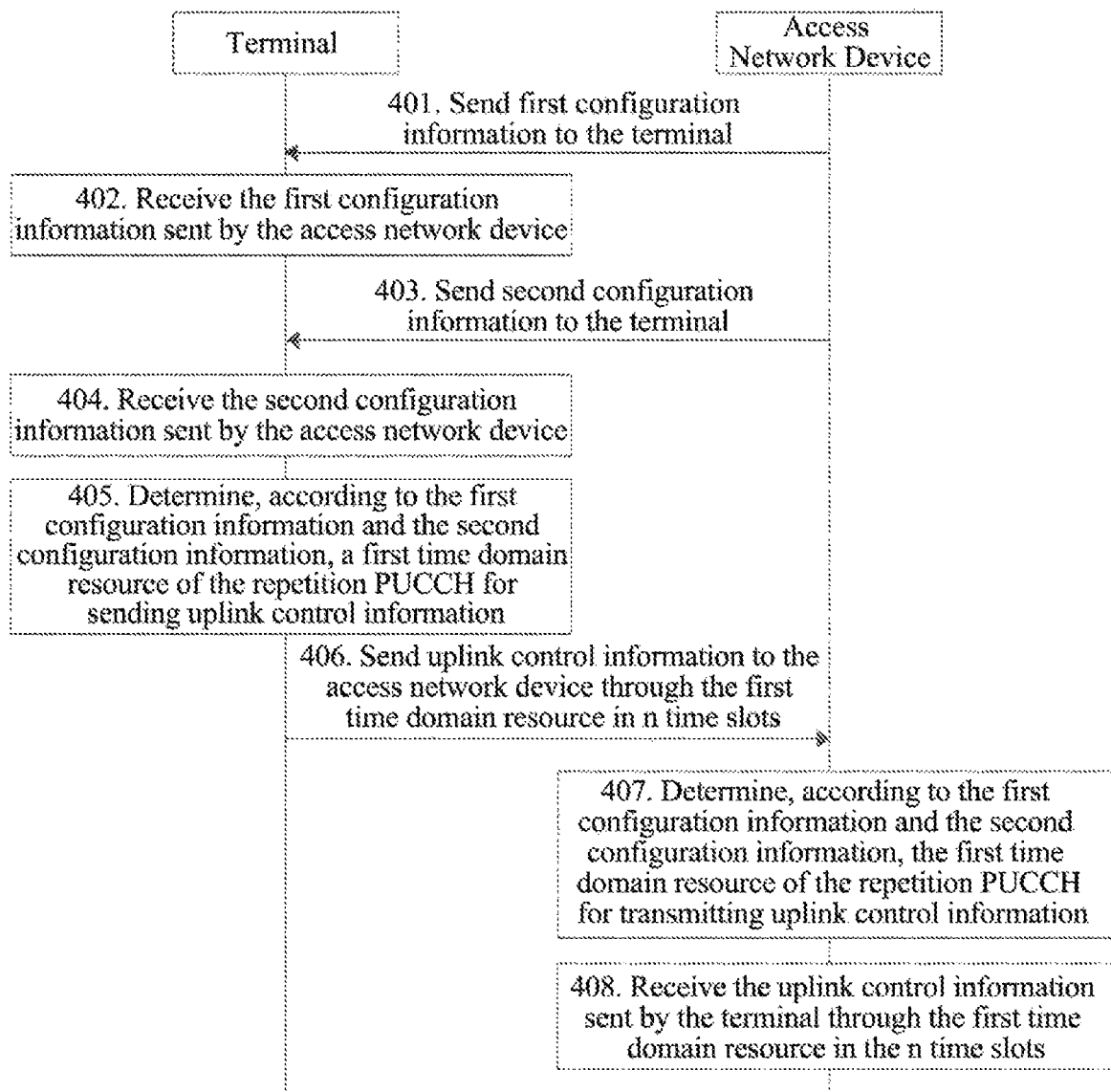
FIG. 4 is a flowchart of a method for determining a resource provided by another example implementation of the present application.

Please refer to FIG. 4, which shows a flowchart of a method for determining a resource provided by an example implementation of the present application. In this implementation, description is given by taking the method being used in the communication system 100 shown in FIG. 1 as an example. This method includes following acts 401 to 408.

In act 401, an access network device sends first configuration information to a terminal.

The first configuration information is used for indicating a second time domain resource configured by the access network device for the repetition PUCCH.

Optionally, a mode in which the first configuration information indicates the second time domain resource is one of following modes.

The first mode is to indicate a quantity of time slots and a quantity of symbols of the repetition PUCCH in each time slot.

For example, the first configuration information indicates that the quantity of the time slots is 4, and the quantity of the symbols of the repetition PUCCH in each time slot is 11.

Optionally, in this method, at least one of an identifier of a time slot, a starting time point of the repetition PUCCH in each time slot, and an ending time point of the repetition PUCCH in each time slot may be obtained by other signaling.

Optionally, the identifier of the time slot may be a slot index, for example, identifier 4 of the time slot is used to represent a 4th slot.

Optionally, for a certain time slot, the starting time point of the repetition PUCCH refers to a first symbol in consecutive symbols used for the repetition PUCCH in the time slot; the ending time point of the repetition PUCCH refers to a last symbol in the consecutive symbols used for the repetition PUCCH in the time slot.

The second mode is to indicate a quantity of time slots and a starting time point and a quantity of symbols of the repetition PUCCH in each time slot.

For example, the first configuration information indicates that the quantity of time slots is 4, the starting time point of the repetition PUCCH in each time slot is a 4th symbol, and the duration is 11 symbols.

Optionally, in this method, the identifiers of the time slots may be obtained by other signaling.

The third mode is to indicate a quantity of time slots and an ending time point and a quantity of symbols of the repetition PUCCH in each time slot.

For example, the first configuration information indicates that the quantity of time slots is 4, the starting time point of the repetition PUCCH in each time slot is the 14th symbol, and duration is 11 symbols.

Optionally, in this method, the identifier of the slot may be obtained by other signaling.

The fourth mode is to indicate a quantity of time slots and identifiers of symbols of the repetition PUCCH in each time slot.

For example, the first configuration information indicates that the quantity of time slots is 4, and identifiers of symbols of PUCCH in each time slot are: {4, 5, 6, 7, 8, 9, 10, 11, 12, 13, 14}.

Optionally, an identifier of a symbol may be an index of the symbol, for example, identifier 5 of the symbol is used to represent a 5th symbol.

Optionally, in this method, an identifier of a time slot may be obtained by other signaling.

The fifth mode is to indicate identifiers of time slots and a quantity of symbols of the repetition PUCCH in each time slot.

For example, the first configuration information indicates the identifiers of the time slots are {1 2 3 4}, and the quantity of symbols of the repetition PUCCH in each time slot is 11.

Optionally, in this method, at least one of the starting time point of the repetition PUCCH in each time slot and the ending time point of the repetition PUCCH in each time slot may be obtained by other signaling.

The sixth mode is to indicate identifiers of time slots and a starting time point and a quantity of symbols of the repetition PUCCH in each time slot.

For example, the first configuration information indicates that the identifiers of the time slots are {1 2 3 4}, the starting time point of the repetition PUCCH in each time slot is a 4th symbol, and a duration is 11 symbols.

The seventh mode is to indicate identifiers of time slots and an ending time point and a quantity of symbols of the repetition PUCCH in each time slot.

For example, the first configuration information indicates that the identifiers of the time slots are {1 2 3 4}, the starting time point of the repetition PUCCH in each time slot is a 14th symbol, and a duration is 11 symbols.

The eighth mode is to indicate identifiers of time slots and identifiers of symbols of the repetition PUCCH in each time slot.

For example, the identifiers of the time slots of the first configuration information are {1 2 3 4}, and the identifiers of the symbols of the repetition PUCCH in each time slot are {4, 5, 6, 7, 8, 9, 10, 11, 12, 13, 14}.

Of course, the mode in which the first configuration information indicates the second time domain resource may also be another mode, such as: to indicate a starting point of the time slot, a length of the time slot and a quantity of symbols of the repetition PUCCH in each time slot; to indicate a starting point of the time slot, a length of the time slot, and a starting time point and a quantity of symbols of the repetition PUCCH in each time slot; to indicate a starting point of the time slot, a length of the time slot, and an ending time point and a quantity of symbols of the repetition PUCCH in each time slot; to indicate a starting point of the time slot, a length of the time slot, and identifiers of symbols of the repetition PUCCH in each time slot; to indicate an ending point of the time slot, a length of the time slot, and a quantity of symbols of the repetition PUCCH in each time slot; to indicate an ending point of the time slot, a length of the time slot, and a starting time point and a quantity of symbols of the repetition PUCCH in each time slot; to indicate an ending point of the time slot, a length of the time slot and an ending time point and a quantity of symbols of the repetition PUCCH in each time slot; to indicate an ending point of the time slot, a length of the time slot and identifiers of symbols of the repetition PUCCH in each time slot, which will not be listed in this implementation.

In act 402, the terminal receives the first configuration information sent by the access network device.

In act 403, the access network device sends second configuration information to the terminal.

The second configuration information is used for indicating a third time domain resource configured by the access network device for uplink signal transmission.

The second configuration information is used for determining an available time domain resource.

Optionally, the second configuration information is information semi-statically configured, and/or the second configuration information is information semi-persistently configured, and/or the second configuration information is information dynamically configured.

Optionally, the information semi-statically configured and/or the information semi-persistently configured may be configuration information for indicating a time domain resource occupied by uplink channel quality measurement (or called SoundingReferenceSignal (SRS)); and/or configuration information for indicating a semi-static subframe format.

Herein, the SRS is used for measuring a channel quality of an uplink channel, and the subframe format is used for indicating a direction of data transmission on each symbol in a certain subframe. For example, the subframe format is {DDSUUUUUUUUUUU}, wherein D represents that only downlink signals can be sent on a corresponding symbol, U represents that only uplink signals can be transmitted on a corresponding symbol, and S represents a special subframe, which is generally used for sending downlink signals. Optionally, this implementation does not limit the quantity of symbols corresponding to the subframe format, for example, the quantity of symbols corresponding to the subframe format is the same as the quantity of symbols in a time slot, and each position in the subframe format is used for indicating a transmission direction of a symbol at a corresponding position in the time slot.

Optionally, the information dynamically configured may be configuration information for indicating a dynamic subframe format.

In an example, when the second configuration information includes configuration information for indicating a time domain resource occupied by an SRS, the available time domain resource determined by the terminal according to the time domain resource occupied by the SRS is a time domain resource other than the time domain resource occupied by the SRS in the time slot.

In another example, when the second configuration information includes configuration information for indicating the subframe format, the available time domain resource determined by the terminal according to the subframe format is the time domain resource, of which a transmission direction is uplink transmission, in the time slot.

It should be noted additionally that the above examples of information semi-statically configured, information semi-persistently configured and information dynamically configured are only illustrative and may be configuration information of another uplink signal in actual implementation.

In act 404, the terminal receives the second configuration information sent by the access network device.

Optionally, the access network device may first send the first configuration information and then send the second configuration information, that is, acts 403 and 404 are performed after acts 401 and 402; and/or, the access network device may first send the second configuration information and then send the first configuration information, that is, acts 403 and 404 are performed before acts 401 and 402; and/or, the access network device may simultaneously transmit the first configuration information and the second configuration information, that is, acts 401 and 403 are performed simultaneously, and acts 402 and 404 are performed simultaneously. This implementation does not limit transmission timing of the first configuration information and the second configuration information.

For example, the second configuration information includes configuration information for indicating the time domain resource occupied by the SRS, configuration information of a subframe format semi-statically configured and configuration information of a subframe format dynamically configured, wherein the configuration information for indicating the time domain resource occupied by the SRS is sent by the access network device to the terminal before the first configuration information, the configuration information of the subframe format semi-statically configured and the first configuration information are simultaneously sent by the access network device to the terminal, and the configuration information of the subframe format dynamically configured is sent by the access network device to the terminal after the first configuration information.

In act 405, the terminal determines, according to the first configuration information and the second configuration information, a first time domain resource of the repetition PUCCH for sending uplink control information.

Optionally, the first time domain resource is an intersection of the second time domain resource and the available time domain resource.

In order to understand the mode in which the terminal determines the first time domain resource more clearly, description will be given below for the determining mode with three examples. The first example (refer to FIG. 5) is described by taking the second configuration information including configuration information for indicating the time domain resource occupied by the SRS, configuration information of the semi-static subframe format and configuration information of the dynamic subframe format as examples; the second example (refer to FIG. 6) is described by taking the second configuration information including configuration information for indicating the time domain resource occupied by the SRS and configuration information of the semi-static subframe format as examples; and the third example (refer to FIG. 7) is described by taking the second configuration information including configuration information of the dynamic subframe format as an example.

Figure 5:
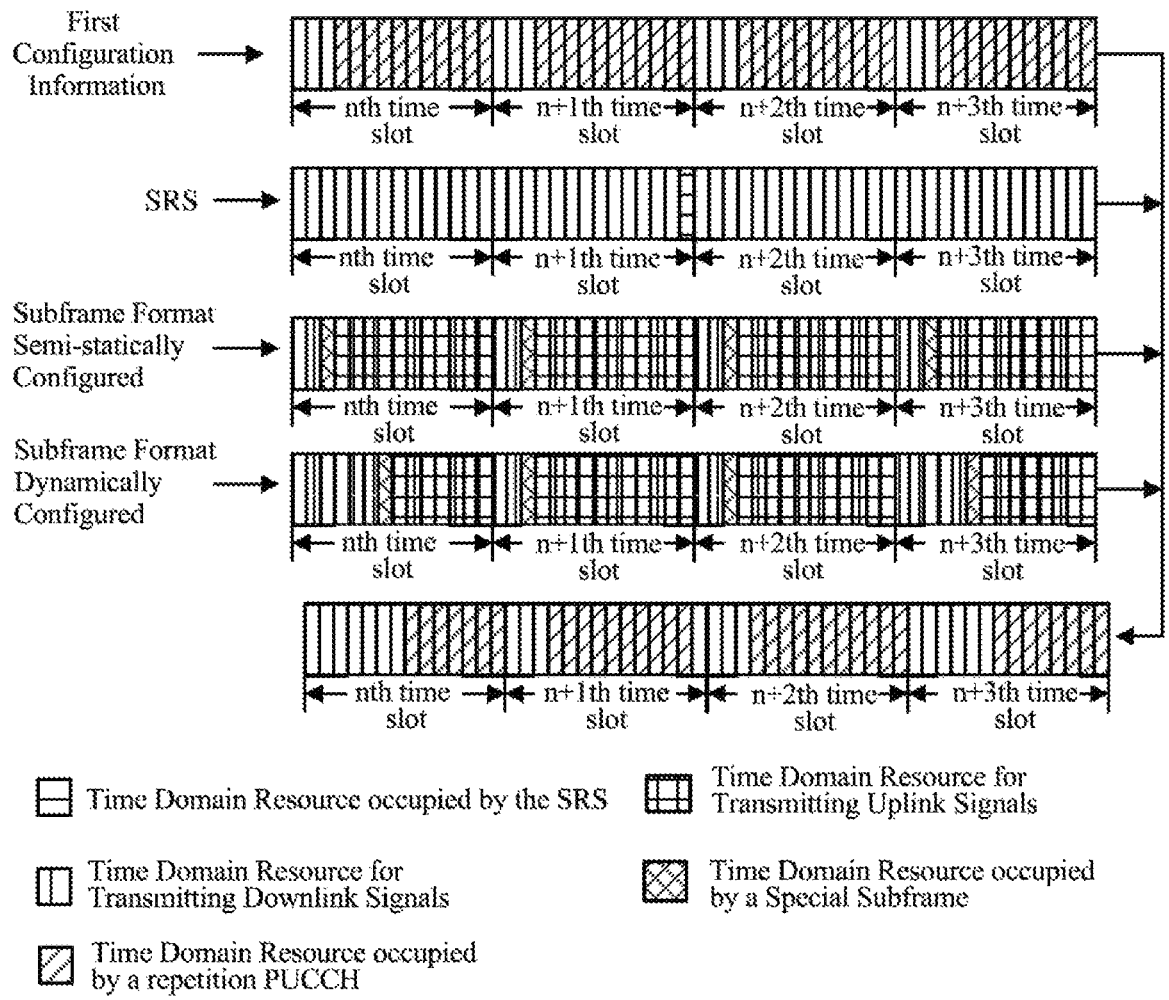
FIG. 5 is a schematic diagram of a repetition PUCCH provided by an example implementation of the present application.

Referring to FIG. 5, it is assumed that the second time domain resource indicated by the first configuration information, that is, the time domain resource configured by the access network device for the repetition PUCCH, is located in an i-th time slot to an i+3th time slot, and is located in a 4th symbol to a 14th symbol in each time slot; configuration information of a time domain resource occupied by the SRS indicated by the second configuration information is: a period of 10 ms, an offset of 1 ms, and a last symbol in the time slot; configuration information of the semi-static subframe format indicated by the second configuration information is {DDSUUUUUUUUUUU}; and configuration information of the dynamic subframe format is {DDDDDDSUUUUUU, DDSUUUUUUUUUUU, DDSUUUUUUUUUUU, DDDDDSUUUUUUUU}. Herein the i is a positive integer.

Taking each time slot including 14 symbols as an example, since the second time domain resource is the 4th symbol to the 14th symbol in each time slot, it may be determined from the 4th symbol in the each time slot.

In the i-th slot, for the 4th symbol, it is determined, according to the semi-static subframe format, that the 4th symbol is for uplink transmission, and it is determined, according to the dynamic subframe format, that the 4th symbol is for downlink transmission, then the 4th symbol is not an available time domain resource.

For the 5th symbol, it is determined, according to the semi-static subframe format, that the 5th symbol is for uplink transmission, and it is determined, according to the dynamic subframe format, that the 5th symbol is for downlink transmission, then the 5th symbol is not an available time domain resource.

For the 6th symbol, it is determined, according to the semi-static subframe format, that the 6th symbol is for uplink transmission, and it is determined, according to the dynamic subframe format, that the 6th symbol is for downlink transmission, then the 6th symbol is not an available time domain resource.

For the 7th symbol, it is determined, according to the semi-static subframe format, that the 7th symbol is for uplink transmission, and it is determined, according to the dynamic subframe format, that the 7th symbol is for downlink transmission, then the 7th symbol is not an available time domain resource.

For the 8th symbol, it is determined, according to the semi-static subframe format, that the 8th symbol is for uplink transmission, and it is determined, according to the dynamic subframe format, that the 8th symbol is for uplink transmission, and it is determined, according to the time domain resource occupied by the SRS, that the 8th symbol is not a time domain resource for transmitting the SRS, then the 8th symbol is an available time domain resource.

For the 9th symbol, it is determined, according to the semi-static subframe format, that the 9th symbol is for uplink transmission, and it is determined, according to the dynamic subframe format, that the 9th symbol is for uplink transmission, and it is determined, according to the time domain resource occupied by the SRS, that the 9th symbol is not a time domain resource for transmitting the SRS, then the 9th symbol is an available time domain resource.

It may be determined, according to the same determining mode as above, that the first time domain resource in the i-th slot is the 8th symbol to the 14th symbol.

It may be determined, according to the same determining mode as above, that the first time domain resource in the i+1th time slot is the 4th symbol to the 13th symbol; it may be determined, according to the same determining mode as above, that the first time domain resource in the i+2th time slot is the 4th symbol to the 14th symbol; it may be determined, according to the same determining mode as above, that the first time domain resource in the i+3th time slot is the 7th symbol to the 14th symbol (as indicated by the shaded part in the last line of the figure).

According to the above content, in this example, the terminal determines the first time domain resource according to information semi-statically configured and information dynamic configured; or, the terminal determines the first time domain resource according to information semi-persistently configured and information dynamically configured.

Figure 6:
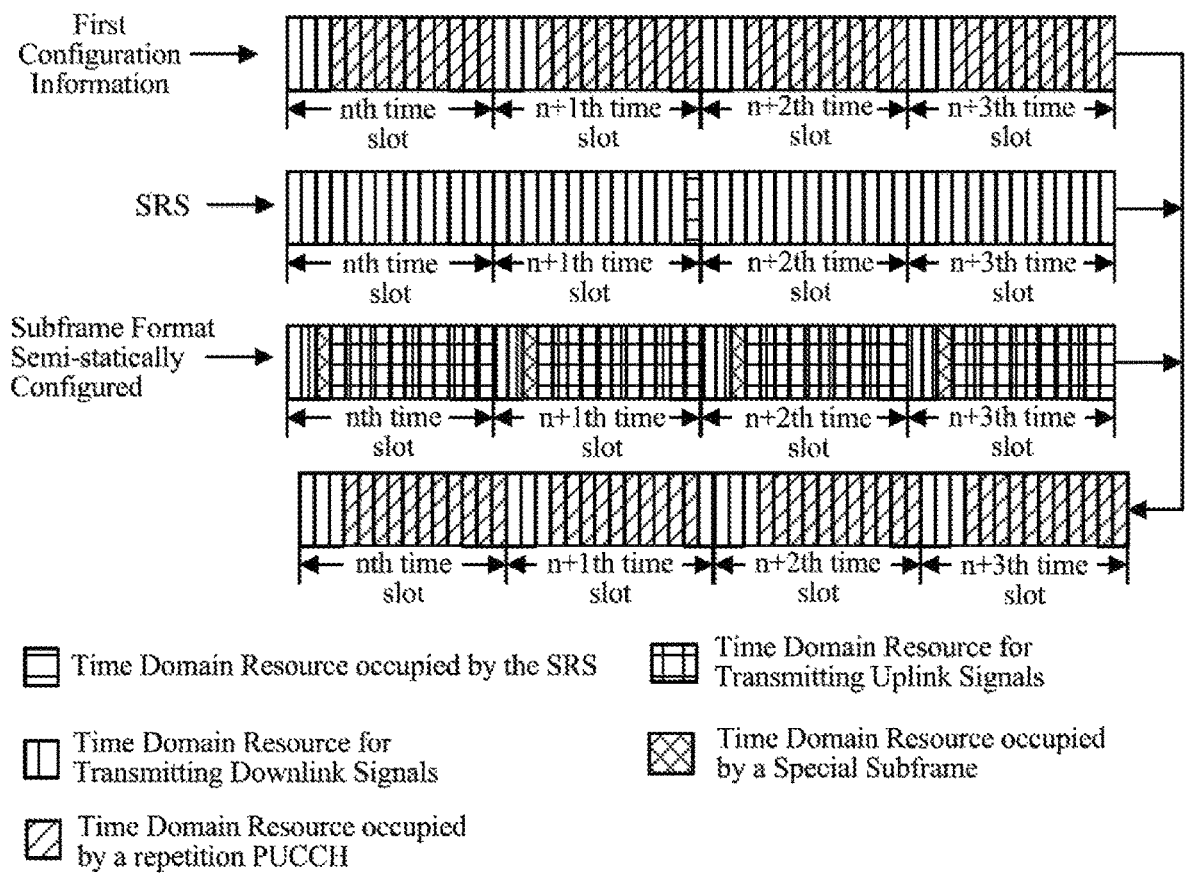
FIG. 6 is a schematic diagram of a repetition PUCCH provided by an example implementation of the present application.

Referring to FIG. 6, it is assumed that the second time domain resource indicated by the first configuration information, that is, the time domain resource configured by the access network device for the repetition PUCCH, is located in the i-th time slot to the i+3th time slot, and is located in the 4th symbol to the 14th symbol in each time slot; configuration information of the time domain resource occupied by the SRS indicated by the second configuration information is: a period of 10 ms, an offset of 1 ms, and a last symbol in a time slot; and configuration information of the semi-static subframe format indicated by the second configuration information is {DDSUUUUUUUUUUU}.

Taking each time slot including 14 symbols as an example, since the second time domain resource is the 4th symbol to the 14th symbol in each time slot, it may be determined from the 4th symbol in each time slot.

According to the determining mode shown in FIG. 5 (this example is only different from the type of the second configuration information used in FIG. 5), it may be determined that the first time domain resource in the i-th time slot is the 4th symbol to the 14th symbol; the first time domain resource in the i+1th time slot is the 4th symbol to the 13th symbol; the first time domain resource in the i+2th time slot is the 4th symbol to the 14th symbol; and the first time domain resource in the i+3th time slot is the 4th symbol to the 14th symbol (as indicated by the shaded part in the last line).

According to the above content, the terminal in this example determines, according to information semi-statically configured or information semi-persistently configured and information dynamically configured, the first time domain resource.

Figure 7:
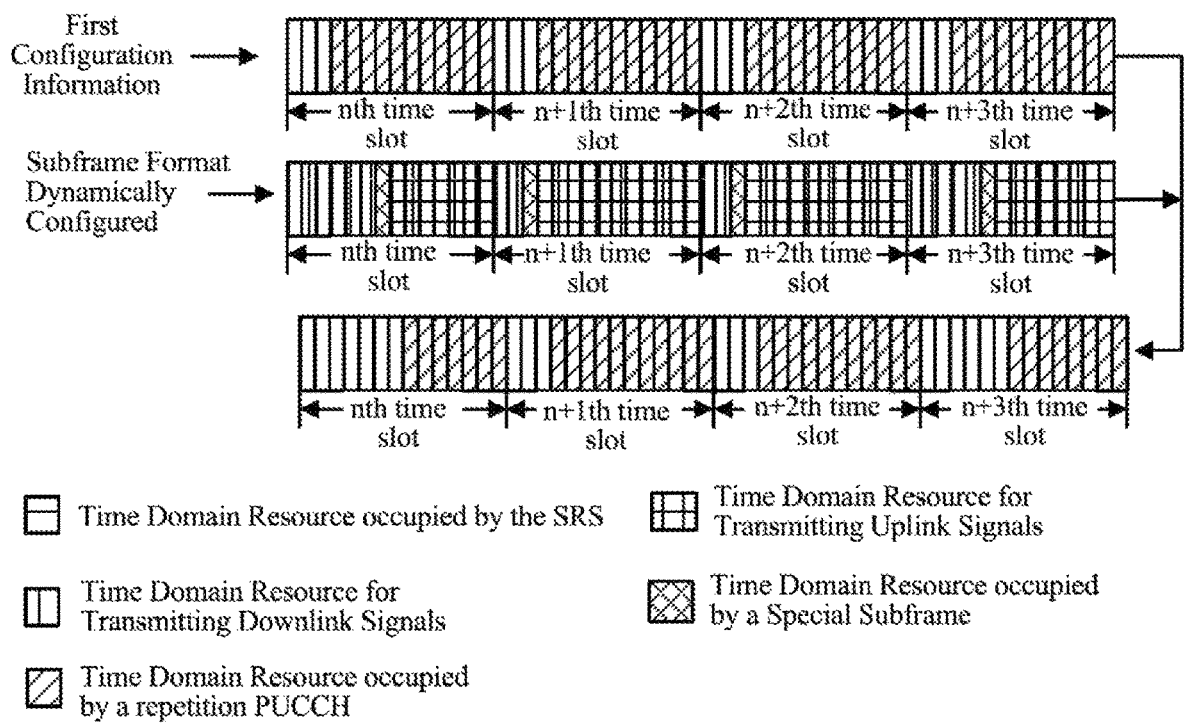
FIG. 7 is a schematic diagram of a repetition PUCCH provided by an example implementation of the present application.

Referring to FIG. 7, it is assumed that the second time domain resource indicated by the first configuration information, that is, the time domain resource configured by the access network device for the repetition PUCCH, is located in the i-th time slot to the i+3th time slot, and is located in the 4th symbol to the 14th symbol in each time slot; the configuration information of the dynamic subframe format indicated by the second configuration information is {DDDDDDSUUUUUUU, DDSUUUUUUUUUUU, DDSUUUUUUUUUUU, DDDDDSUUUUUUUU}.

Taking each time slot including 14 symbols as an example, since the second time domain resource is the 4th symbol to the 14th symbol in each time slot, it may be determined from the 4th symbol in each time slot.

According to the determining mode shown in FIG. 5 (this example is only different from the type of the second configuration information used in FIG. 5), it may be determined that the first time domain resource in the i-th time slot is the 8th symbol to the 14th symbol; the first time domain resource in the i+1th time slot is the 4th symbol to the 14th symbol; the first time domain resource in the i+2th time slot is the 4th symbol to the 14th symbol; and the first time domain resource in the i+3th time slot is the 7th symbol to the 14th symbol (as indicated by the shaded part in the last line).

According to the above content, the terminal in this example determines, according to information dynamically configured, the first time domain resource.

In act 406, the terminal sends uplink control information to the access network device through the first time domain resource in n time slots.

Optionally, the uplink control information sent in different time slots is the same; or, the uplink control information sent in different time slots is different.

Illustratively, the terminal sends the uplink control information through the first time slot of n time slots, then sends the uplink control information through the second time slot of the n time slots . . . and then sends the uplink control information through the nth time slot of the n time slots.

In act 407, the access network device determines, according to the first configuration information and the second configuration information, the first time domain resource of the repetition PUCCH for transmitting uplink control information.

The mode in which the access network device determines the first time domain resource is the same as the mode in which the terminal determines the first time domain resource. In this way, the access network device may determine a location of the first time domain resource with no need of generating control signaling, and may be the same as the first time domain resource determined by the terminal, ensuring accuracy of determining, by the access network device, the first time domain resource.

Optionally, the access network device determines, according to the second configuration information, an available time domain resource, and then determines, according to an intersection of the second time domain resource indicated by the first configuration information and the available time domain resource, the first time domain resource. In other words, the first time domain resource determined by the access network device is the intersection of the second time domain resource and the available time domain resource.

In act 408, the access network device receives the uplink control information sent by the terminal through the first time domain resource in the n time slots.

Illustratively, the access network device receives the uplink control information sent in the first time slot by the terminal in the first time slot of the n time slots, then receives the uplink control information sent in the second time slot by the terminal through the second time slot in the n time slots . . . and then receives the uplink control information sent in the nth time slot by the terminal through the nth time slot of the n time slots.

It should be noted additionally that since there is a certain distance between the access network device and the terminal, from a perspective of absolute time, the position of the j-th time slot in which the access network receives the uplink control information in this implementation is different from the position of the j-th time slot in which the terminal sends the uplink control information. In other words, the time slot in which the access network device receives the uplink control information has a certain delay compared with the time slot in which the terminal sends the uplink control information. Herein, the j is a positive integer and j≤n.

To sum up, the method for determining the resource provided in this implementation determines, according to the first configuration information and the second configuration information, the time domain resource of the repetition PUCCH for sending the uplink control information, and since the second time domain resource of the repetition PUCCH configured by the access network device can be determined according to the first configuration information, and the available time domain resource for uplink transmission can be determined according to the second configuration information, the terminal and the access network device can directly use the available time domain resource in the second time domain resource to transmit the uplink control information, with no need of additionally sending, by the access network device, control signaling to indicate the time domain resource for transmitting the uplink control information, which can solve a problem of large overhead of control signaling and save overhead of control information.

Optionally, the above acts 401, 403, 407 and 408 may be separately implemented as a method implementation on a side of the access network device; and the above acts 402, 404, 405 and 406 may be separately implemented as a method implementation on a side of the terminal.

Optionally, in the above implementation, if the access network device has successfully parsed out uplink control information after receiving the uplink control information in the first m time slots of the n time slots, then it may indicate (explicitly indicate or implicitly indicate) the terminal to stop sending the uplink control information. Herein, the uplink control information sent by the terminal in the first m time slots is the same. The m is an integer and 1≤m<n.

Figure 8:
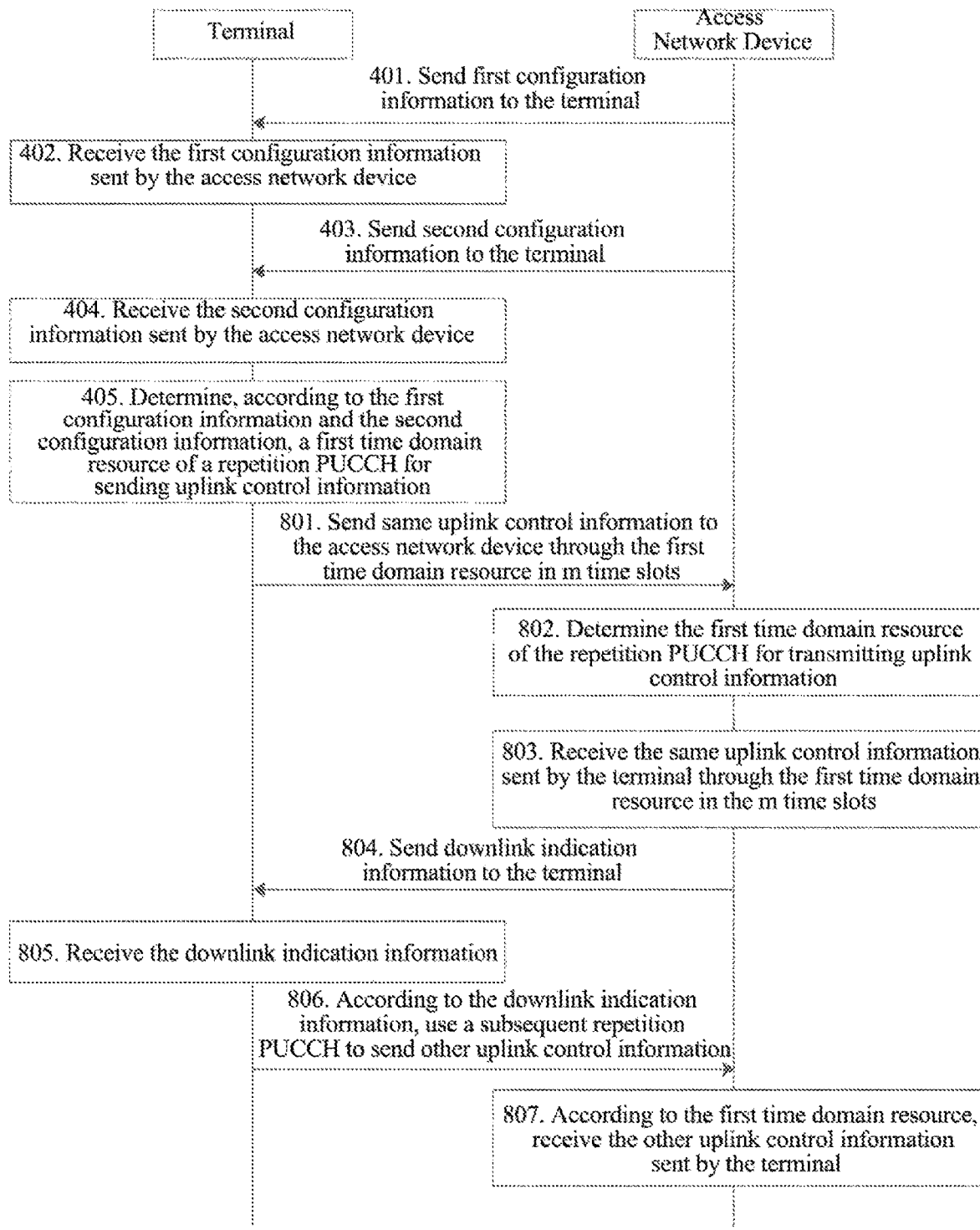
FIG. 8 is a flowchart of a method for determining a resource provided by another example implementation of the present application.

Please refer to FIG. 8, which shows a flowchart of a method for determining a resource provided by an example implementation of the present application. In this implementation, description is given by taking the method being used in the communication system 100 shown in FIG. 1 as an example. Based on the implementation shown in FIG. 4, the method further includes following acts.

As an alternative act of act 406, in act 801, the terminal sends same uplink control information to the access network device through the first time domain resource in m time slots.

As an alternative act of act 407, in act 802, the access network device determines the first time domain resource of the repetition PUCCH for transmitting uplink control information.

As an alternative act of act 408, in act 803, the access network device receives the same uplink control information sent by the terminal through the first time domain resource in the m time slots.

In act 804, the access network device sends downlink indication information to the terminal.

Optionally, when the access network device parses out the uplink control information according to the repetition PUCCH in the first m time slots, it sends the downlink indication information to the terminal.

Optionally, the downlink indication information includes information indicating the terminal to stop using a subsequent aggregated PUCCH to send uplink control information. At this time, the downlink indication information explicitly indicates information for indicating the terminal to stop using a subsequent aggregated PUCCH to send uplink control information.

Optionally, the downlink indication information includes information indicating the terminal to use a subsequent aggregated PUCCH to send other uplink control information. At this time, the downlink indication information implicitly indicates information for indicating the terminal to stop using a subsequent aggregated PUCCH to send uplink control information.

Herein, the other uplink control information refers to uplink control information different from the uplink control information received by the access network device in the first m time slots.

Herein, the subsequent aggregated PUCCH refers to the repetition PUCCH in the n time slots except the first m time slots.

In act 805, the terminal receives the downlink indication information.

In act 806, according to the downlink indication information, the terminal uses a subsequent aggregated PUCCH to send other uplink control information.

Optionally, as an alternative act of act 805, the terminal may also stop, according to the downlink indication information, using a subsequent aggregated PUCCH to send uplink control information.

Illustratively, when the downlink indication information includes the information indicating the terminal to stop using the subsequent aggregated PUCCH to send the uplink control information, the terminal stops, according to the downlink indication information, using the subsequent aggregated PUCCH to send the uplink control information; and when the downlink indication information includes the information indicating the terminal to use the subsequent aggregated PUCCH to send the other uplink control information, the terminal uses, according to the downlink indication information, the subsequent aggregated PUCCH to send the other uplink control information.

In act 807, according to the first time domain resource, the access network device receives the other uplink control information sent by the terminal.

Optionally, the access network device may determine, according to the first configuration information and the second configuration information, the first time domain resource for transmitting the other uplink control information again, and then receive, according to the determined first time domain resource, the other uplink control information sent by the terminal; or, the access network device receives, according to the first time domain resource determined in act 802, the other uplink control information sent by the terminal.

Optionally, in this implementation, the uplink control information sent by the terminal on the n time slots includes same uplink control information sent in first m time slots and other uplink control information sent subsequently.

To sum up, the method for determining the resource provided in this implementation can avoid, by sending downlink indication information to the terminal to indicate the terminal to stop sending the uplink control information when the access network device successfully parses out, according to the repetition PUCCH in m time slots, the same uplink control information sent by the terminal, a problem that the terminal continues to use a subsequent aggregated PUCCH to send uplink control information, resulting in that the terminal sends redundant information, which wastes uplink transmission resources, and can achieve an effect of saving uplink transmission resources.

Optionally, the above acts 801, 805 and 806 may be separately implemented as a method implementation on a side of the terminal; and the above acts 802, 803, 804 and 807 may be separately implemented as a method implementation on a side of the access network device.

Optionally, in the present application, the same uplink control information sent by the terminal in the m time slots may be feedback information, wherein the feedback information is an acknowledgement response or a non-acknowledgement response.

The acknowledgement response is used for indicating that downlink data have been correctly received, for example, the acknowledgement response is an ACK response.

The non-acknowledgement response is used for indicating that downlink data have not been correctly received, for example, the non-acknowledgement response is a NACK response.

Herein, the downlink data are data sent by the access network device and received by the terminal before sending the uplink control information.

Optionally, in the present application, the downlink indication information is a downlink Grant, and the downlink indication information is used for indicating to schedule a Hybrid Automatic Repeat reQuest (HARQ) process corresponding to the feedback information to send uplink data.

The method for determining the resource provided in this implementation will be described below, by taking the uplink control information being the feedback information and the downlink indication information being used for indicating to schedule the HARQ process corresponding to the feedback information to send uplink data as examples.

Figure 9:
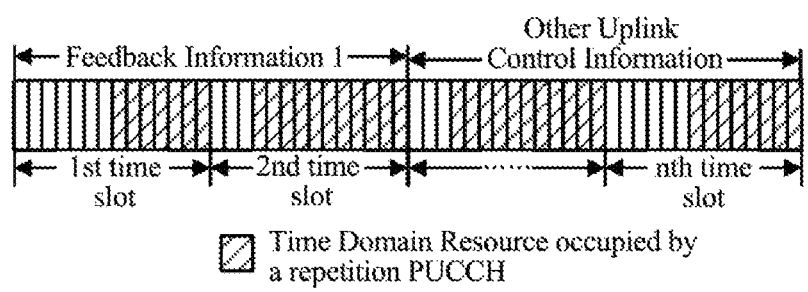
FIG. 9 is a schematic diagram of a repetition PUCCH provided by an example implementation of the present application.

Referring to FIG. 9, it is assumed that the terminal sends feedback information corresponding to HARQ processes #1, #2, #3, #3 to the access network device through the repetition PUCCH. The access network device successfully parses out, according to the repetition PUCCH in the first time slot and the repetition PUCCH in the second time slot, the feedback information corresponding to the HARQ processes #1, #2, #3, #3, and at this time, generates downlink indication information, wherein the downlink indication information is used for indicating the terminal to schedule at least one of the HARQ processes #1, #2, #3, and #3 to send uplink data.

The terminal stops sending the feedback information corresponding to the HARQ processes #1, #2, #3, #3 on a subsequent aggregated PUCCH, but sends other uplink control information.

Figure 10:
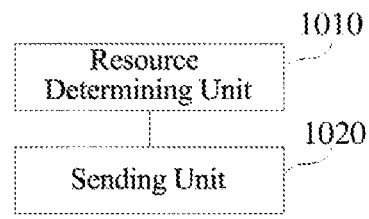
FIG. 10 is a block diagram of an apparatus for determining a resource provided by an example implementation of the present application.

Please refer to FIG. 10, which shows a block diagram of an apparatus for determining a resource provided by an implementation of the present application. The feedback information transmission apparatus may be implemented as all or part of the terminal 140 in the communication system 100 shown in FIG. 1 by software, hardware, or a combination of the two. This implementation takes the terminal 140 being a UE in an LTE system or in a 5G system as an example. The resource determining apparatus may include a resource determining unit 1010 and a sending unit 1020.

The resource determining unit 1010 is configured to determine, according to first configuration information and second configuration information, a first time domain resource of a repetition PUCCH for sending uplink control information; the sending unit 1020 is configured to send the uplink control information to an access network device through the first time domain resource in n time slots, wherein the n is a positive integer; wherein the first configuration information is used for indicating a second time domain resource configured by the access network device for the repetition PUCCH, and the first time domain resource belongs to the second time domain resource; and the second configuration information is used for indicating a third time domain resource configured by the access network device for uplink signal transmission.

Optionally, the first time domain resource is an intersection of the second time domain resource and an available time domain resource, wherein the available time domain resource is determined according to the third time domain resource.

Optionally, the second configuration information is information semi-statically configured, and/or the second configuration information is information semi-persistently configured, and/or the second configuration information is information dynamically configured.

Optionally, the second configuration information includes: configuration information for indicating a time domain resource occupied by an SRS for uplink channel quality measurement; and/or, configuration information for indicating a subframe format.

Optionally, a mode in which the first configuration information indicates the second time domain resource is one of following modes: indicating a quantity of time slots and a quantity of symbols of the repetition PUCCH in each time slot; indicating a quantity of time slots and a starting time point and a quantity of symbols of the repetition PUCCH in each time slot; indicating a quantity of time slots and an ending time point and a quantity of symbols of the repetition PUCCH in each time slot; indicating a quantity of time slots and identifiers of symbols of the repetition PUCCH in each time slot; indicating identifiers of time slots and a quantity of symbols of the repetition PUCCH in each time slot; indicating identifiers of time slots and a starting time point and a quantity of symbols of the repetition PUCCH in each time slot; indicating identifiers of time slots and an ending time point and a quantity of symbols of the repetition PUCCH in each time slot; indicating identifiers of time slots and identifiers of symbols of the repetition PUCCH in each time slot; wherein the each time slot includes at least one symbol.

Optionally, the n is greater than 1, and after the terminal sends the uplink control information to the access network device through the first time domain resource in first m time slots of the n time slots, the apparatus further includes a receiving unit, configured to receive downlink indication information sent by the access network device; the sending unit is further configured to stop, according to the downlink indication information, using a subsequent aggregated PUCCH to send the uplink control information; or, the terminal uses, according to the downlink indication information, a subsequent aggregated PUCCH to send other uplink control information; wherein the subsequent aggregated PUCCH refers to the repetition PUCCH in the n time slots except the first m time slots; the m is an integer, and 1≤m<n.

Optionally, the uplink control information includes feedback information, wherein the feedback information is an acknowledgement response or a non-acknowledgement response, the acknowledgement response is used for indicating that downlink data have been correctly received, and the non-acknowledgement response is used for indicating that the downlink data have not been correctly received; the downlink data are data sent by the access network device received by the terminal before sending the uplink control information; the downlink indication information is a downlink Grant, and the downlink indication information is used for indicating to schedule a HARQ process corresponding to the feedback information to send uplink data.

Optionally, before the terminal determines, according to the first configuration information and the second configuration information, the first time domain resource occupied by the repetition PUCCH for sending uplink control information in each time slot, the receiving unit is further configured to receive the first configuration information sent by the access network device; the receiving unit is further configured to receive the second configuration information sent by the access network device.

Relevant details may be combined with reference to the above method implementation.

Figure 11:
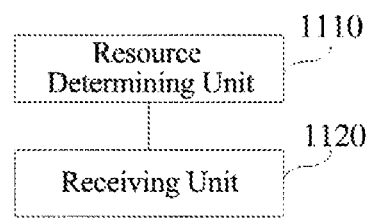
FIG. 11 is a block diagram of an apparatus for determining a resource provided by an example implementation of the present application.

Please refer to FIG. 11, which shows a block diagram of an apparatus for determining a resource provided by an implementation of the present application. The feedback information transmission apparatus may be implemented as all or part of the access network device 120 in the communication system 100 shown in FIG. 1 by software, hardware or a combination of the two. This implementation takes the access network device 120 being an eNB in an LTE system or a gNB in a 5G system as an example. The apparatus for determining for resource may include a resource determining unit 1110 and a receiving unit 1120.

The resource determining unit 1110 is configured to determine, according to first configuration information and second configuration information, a first time domain resource of a repetition PUCCH over multiple slots for transmitting uplink control information; the receiving unit 1120 is configured to receive the uplink control information sent by the terminal through the first time domain resource in n time slots, wherein the n is a positive integer; wherein the first configuration information is used for indicating a second time domain resource configured by the access network device for the repetition PUCCH, and the first time domain resource belongs to the second time domain resource; and the second configuration information is used for indicating a third time domain resource configured by the access network device for uplink signal transmission.

Optionally, the first time domain resource is an intersection of the second time domain resource and an available time domain resource, wherein the available time domain resource is determined according to the third time domain resource.

Optionally, the second configuration information is information semi-statically configured, and/or the second configuration information is information semi-persistently configured, and/or the second configuration information is information dynamically configured.

Optionally, the second configuration information includes: configuration information for indicating a time domain resource occupied by an SRS for uplink channel quality measurement; and/or, configuration information for indicating a subframe format.

Optionally, a mode in which the first configuration information indicates the second time domain resource is one of following modes: indicating a quantity of time slots and a quantity of symbols of the repetition PUCCH in each time slot; indicating a quantity of time slots and a starting time point and a quantity of symbols of the repetition PUCCH in each time slot; indicating a quantity of time slots and an ending time point and a quantity of symbols of the repetition PUCCH in each time slot; indicating a quantity of time slots and identifiers of symbols of the repetition PUCCH in each time slot; indicating identifiers of time slots and a quantity of symbols of the repetition PUCCH in each time slot; indicating identifiers of time slots and a starting time point and a quantity of symbols of the repetition PUCCH in each time slot; indicating identifiers of time slots and an ending time point and a quantity of symbols of the repetition PUCCH in each time slot; indicating identifiers of time slots and identifiers of symbols of the repetition PUCCH in each time slot; wherein the each time slot includes at least one symbol.

Optionally, the n is greater than 1, and the apparatus further includes a sending unit.

The sending unit is configured to send downlink indication information to the terminal after receiving the uplink control information in first m time slots of the n time slots, wherein the downlink indication information includes information indicating the terminal to stop using a subsequent aggregated PUCCH to send the uplink control information; or, the downlink indication information includes information indicating the terminal to use a subsequent aggregated PUCCH to send other uplink control information, wherein the m is an integer and 1≤m<n; wherein the subsequent aggregated PUCCH refers to the repetition PUCCH in the n time slots except the first m time slots.

Optionally, the uplink control information includes feedback information, wherein the feedback information is an acknowledgement response or a non-acknowledgement response, the acknowledgement response is used for indicating that downlink data have been correctly received, and the non-acknowledgement response is used for indicating that the downlink data have not been correctly received; the downlink data are data which the access network device sends to the terminal before receiving the uplink control information; the downlink indication information is a downlink grant (DL Grant), and the downlink indication information is used for indicating to schedule a HARQ process corresponding to the feedback information to send uplink data.

Optionally, before the access network device receives the uplink data sent by the terminal through the repetition PUCCH in at least one time slot, the sending unit is further configured to send the first configuration information to the terminal; the sending unit is further configured to send the second configuration information to the terminal.

Relevant details may be combined with reference to the above method implementation.

Figure 12:
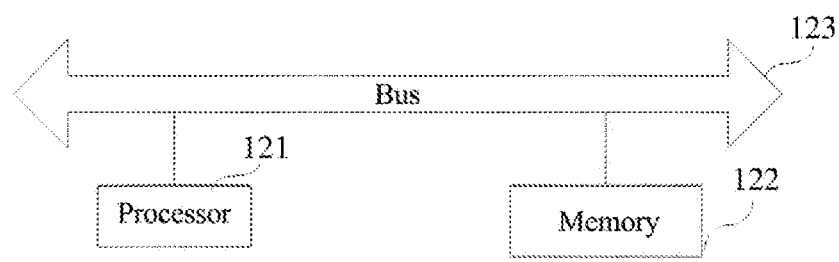
FIG. 12 is a schematic structural diagram of a terminal provided by an example implementation of the present application.

Please refer to FIG. 12, which shows a schematic structural diagram of a terminal provided by an example implementation of the present application. The terminal includes a processor 121, a memory 122 and a bus 123.

The processor 121 includes one or more processing cores, and the processor 121 executes various functional applications and information processing by running software programs and modules.

The memory 122 is connected to the processor 121 via the bus 123.

The memory 122 may be configured to store at least one instruction, and the processor 121 is configured to execute the at least one instruction to implement various acts in the above method implementation.

In addition, the memory 122 may be implemented by any type of a volatile or nonvolatile storage device or a combination thereof, such as Static Random Access Memory (SRAM), Electrically Erasable Programmable Read Only Memory (EEPROM), Erasable Programmable Read Only Memory (EPROM), Programmable Read Only Memory (PROM), Read Only Memory (ROM), a magnetic memory, a flash memory, a magnetic disk or an optical disk.

Optionally, FIG. 12 shows only a simplified design of a terminal. In another implementation, the terminal may contain any quantity of transmitters, receivers, processors, controllers, memories, communication units, etc., and all access network devices which can implement the present disclosure are within the scope of protection of the present disclosure.

Figure 13:
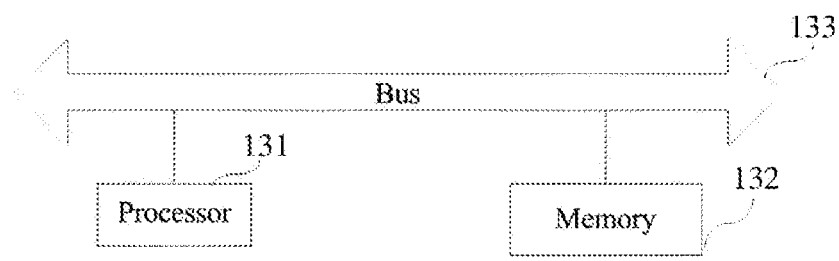
FIG. 13 is a schematic structural diagram of an access network device provided by an example implementation of the present application.

Please refer to FIG. 13, which shows a schematic structural diagram of an access network device provided by an example implementation of the present application. The access network device includes a processor 131, a memory 132 and a bus 133.

The processor 131 includes one or more processing cores, and the processor 131 executes various functional applications and information processing by running software programs and modules.

The memory 132 is connected to the processor 131 via the bus 133.

The memory 132 may be configured to store at least one instruction, and the processor 131 is configured to execute the at least one instruction to implement various acts in the above method implementation.

In addition, the memory 132 may be implemented by any type of a volatile or nonvolatile storage device or a combination thereof, such as Static Random Access Memory (SRAM), Electrically Erasable Programmable Read Only Memory (EEPROM), Erasable Programmable Read Only Memory (EPROM), Programmable Read Only Memory (PROM), Read Only Memory (ROM), a magnetic memory, a flash memory, a magnetic disk or an optical disk.

Optionally, FIG. 13 only shows a simplified design of an access network device. In another implementation, the access network device may contain any quantity of transmitters, receivers, processors, controllers, memories, communication units, etc., and all access network devices which can implement the present disclosure are within the scope of protection of the present disclosure.

An implementation of the present application also provides a communication system, wherein the communication system may contain a terminal and an access network device.

The terminal is configured to determine, according to first configuration information and second configuration information, a first time domain resource occupied by a repetition PUCCH for sending uplink control information in each time slot; the terminal sends the uplink control information to the access network device through the first time domain resource in n time slots, wherein the n is a positive integer; the access network device is configured to receive uplink control information sent by the terminal through the repetition PUCCH in n time slots; determine, according to the first configuration information and the second configuration information, a first time domain resource occupied by the uplink control information in each time slot; wherein the first configuration information is used for indicating a second time domain resource configured by the access network device for the repetition PUCCH, and the first time domain resource belongs to the second time domain resource; and the second configuration information is used for indicating a third time domain resource configured by the access network device for uplink signal transmission.

Those skilled in the art should realize that, in one or more examples described above, the functions described in implementations of the present application may be implemented by using hardware, software, firmware or any combination thereof. When the present disclosure is implemented by software, the above functions may be stored in a computer readable medium or serve as one or multiple instructions or codes on the computer readable medium for transmission. The computer readable medium includes a computer storage medium and a communication medium, where the communication medium includes any medium for conveniently transmitting computer programs from one place to another place. The storage medium may be any available medium that a general purpose computer or a special purpose computer can access.

The above description is only the preferred implementation of the present application and is not intended to limit the present application. Any modification, equivalent substitution, improvement, etc. made within the spirit and principles of the present application shall be included in the scope of protection of the present application.

What is claimed is:

1. A method for determining a resource, comprising:
   determining, by a terminal according to first configuration information and second configuration information, a first time domain resource of a repetition Physical Uplink Control Channel (PUCCH) for sending uplink control information; and
   sending, by the terminal, the uplink control information to an access network device through the first time domain resource in n time slots, wherein the n is a positive integer;
   wherein the first configuration information is used for indicating a second time domain resource configured by the access network device for the repetition PUCCH, and the first time domain resource belongs to the second time domain resource; and the second configuration information is used for indicating a third time domain resource configured by the access network device for uplink signal transmission;
   wherein the first time domain resource is an intersection of the second time domain resource and an available time domain resource, wherein the available time domain resource is determined according to the third time domain resource.

2. The method according to claim 1, wherein the second configuration information comprises configuration information for indicating subframe format.

3. The method according to claim 2, further comprising:
determining, by the terminal according to the subframe format, that an available time domain resource is a time domain resource on which uplink control information is able to be sent by the terminal.

4. The method according to claim 3, wherein the available time domain resource does not comprise a time domain resource of which a transmission direction is downlink.

5. The method according to claim 1, wherein the second configuration information is at least one of: information semi-statically configured, information semi-persistently configured, or information dynamically configured.

6. The method according to claim 1, wherein a mode in which the first configuration information indicates the second time domain resource is one of following modes:
indicating a quantity of time slots and a quantity of symbols of the repetition PUCCH in each time slot;
indicating a quantity of time slots and a starting time point and a quantity of symbols of the repetition PUCCH in each time slot;
indicating a quantity of time slots and an ending time point and a quantity of symbols of the repetition PUCCH in each time slot;
indicating a quantity of time slots and identifiers of symbols of the repetition PUCCH in each time slot;
indicating identifiers of time slots and a quantity of symbols of the repetition PUCCH in each time slot;
indicating identifiers of time slots and a starting time point and a quantity of symbols of the repetition PUCCH in each time slot;
indicating identifiers of time slots and an ending time point and a quantity of symbols of the repetition PUCCH in each time slot; and
indicating identifiers of time slots and identifiers of symbols of the repetition PUCCH in each time slot;
wherein the each time slot comprises at least one symbol.

7. The method according to claim 1, further comprising:
before determining, by the terminal according to the first configuration information and the second configuration information, the first time domain resource occupied by the repetition PUCCH for sending uplink control information in each time slot:
receiving the first configuration information sent by the access network device; and
receiving the second configuration information sent by the access network device.

8. A method for determining a resource, comprising:
determining, by an access network device according to first configuration information and second configuration information, a first time domain resource of a repetition Physical Uplink Control Channel (PUCCH) for transmitting uplink control information; and
receiving, by the access network device, the uplink control information sent by a terminal through the first time domain resource in n time slots, wherein the n is a positive integer;
wherein the first configuration information is used for indicating a second time domain resource configured by the access network device for the repetition PUCCH, and the first time domain resource belongs to the second time domain resource; and the second configuration information is used for indicating a third time domain resource configured by the access network device for uplink signal transmission;
wherein the first time domain resource is an intersection of the second time domain resource and an available time domain resource, wherein the available time domain resource is determined according to the third time domain resource.

9. The method according to claim 8, wherein the second configuration information comprises configuration information for indicating subframe format.

10. The method according to claim 9, wherein the subframe format is used for determining that an available time domain resource is a time domain resource on which uplink control information is able to be sent.

11. The method according to claim 10, wherein the available time domain resource does not comprise a time domain resource of which a transmission direction is downlink.

12. The method according to claim 8, wherein the second configuration information is at least one of: information semi-statically configured, information semi-persistently configured, or information dynamically configured.

13. The method according to claim 8, wherein a mode in which the first configuration information indicates the second time domain resource is one of following modes:
indicating a quantity of time slots and a quantity of symbols of the repetition PUCCH in each time slot;
indicating a quantity of time slots and a starting time point and a quantity of symbols of the repetition PUCCH in each time slot;
indicating a quantity of time slots and an ending time point and a quantity of symbols of the repetition PUCCH in each time slot;
indicating a quantity of time slots and identifiers of symbols of the repetition PUCCH in each time slot;
indicating identifiers of time slots and a quantity of symbols of the repetition PUCCH in each time slot;
indicating identifiers of time slots and a starting time point and a quantity of symbols of the repetition PUCCH in each time slot;
indicating identifiers of time slots and an ending time point and a quantity of symbols of the repetition PUCCH in each time slot; and
indicating identifiers of time slots and identifiers of symbols of the repetition PUCCH in each time slot;
wherein the each time slot comprises at least one symbol.

14. The method according to claim 8, further comprising:
before receiving, by the access network device, uplink data sent by the terminal through the repetition PUCCH in at least one time slot:
sending the first configuration information to the terminal; and
sending the second configuration information to the terminal.

15. A terminal, comprising a processor and a memory, wherein the memory stores at least one instruction for execution by the processor to:
determine, according to first configuration information and second configuration information, a first time domain resource of a repetition Physical Uplink Control Channel (PUCCH) for sending uplink control information; and
send, through a transmitter, the uplink control information to an access network device through the first time domain resource in n time slots, wherein the n is a positive integer;

wherein the first configuration information is used for indicating a second time domain resource configured by the access network device for the repetition PUCCH, and the first time domain resource belongs to the second time domain resource; and the second configuration information is used for indicating a third time domain resource configured by the access network device for uplink signal transmission;

wherein the first time domain resource is an intersection of the second time domain resource and an available time domain resource, wherein the available time domain resource is determined according to the third time domain resource.

16. An access network device, comprising a processor and a memory, wherein the memory stores at least one instruction for execution by the processor to:

determine a first time domain resource of a repetition Physical Uplink Control Channel (PUCCH) for transmitting uplink control information according to first configuration information and second configuration information; and receive, through a receiver, the uplink control information sent by a terminal through the first time domain resource in n time slots, wherein the n is a positive integer;

wherein the first configuration information is used for indicating a second time domain resource configured by the access network device for the repetition PUCCH, and the first time domain resource belongs to the second time domain resource; and the second configuration information is used for indicating a third time domain resource configured by the access network device for uplink signal transmission;

wherein the first time domain resource is an intersection of the second time domain resource and an available time domain resource, wherein the available time domain resource is determined according to the third time domain resource.

* * * * *